United States Patent
Smith

[19]

[11] Patent Number: 5,862,884
[45] Date of Patent: Jan. 26, 1999

[54] LIGHTWEIGHT VERTICAL LIFT DEVICE FOR WINDY CONDITIONS

[75] Inventor: Dave W. Smith, Calgary, Canada

[73] Assignee: Adaptive Engineering, Ltd., Canada

[21] Appl. No.: 708,193

[22] Filed: Sep. 6, 1996

Related U.S. Application Data

[60] Provisional application No. 60/003,433 Sep. 8, 1995.

[51] Int. Cl.⁶ .................... E06C 5/04; B66B 9/00; B66F 7/12; B66F 9/06
[52] U.S. Cl. ............ 187/200; 187/213; 187/232; 187/233; 187/240; 14/69.5; 182/69.6
[58] Field of Search .................. 187/200, 232, 187/414, 231, 233, 213, 240; 414/921, 537, 540; 14/69.5, 72.5; 52/183; 182/1, 69.6; 280/766.1

[56] References Cited

U.S. PATENT DOCUMENTS

| | | | |
|---|---|---|---|
| 298,212 | 5/1884 | Knight | 182/1 |
| 1,419,834 | 6/1922 | Fellows | 182/1 |
| 3,749,201 | 7/1973 | Clarke | 187/201 |
| 4,488,326 | 12/1984 | Cherry | 414/495 |
| 4,529,063 | 7/1985 | Kishi | 187/232 |
| 4,768,617 | 9/1988 | Mason et al. | 182/1 |
| 4,926,973 | 5/1990 | Smith | 414/921 |
| 5,040,638 | 8/1991 | Smith | 187/200 |
| 5,154,569 | 10/1992 | Eryou et al. | 187/200 |
| 5,509,502 | 4/1996 | Beaulieu | 187/242 |

FOREIGN PATENT DOCUMENTS

| | | | |
|---|---|---|---|
| 315562 | 11/1919 | Germany | 187/213 |
| 901226 | 1/1982 | U.S.S.R. | 187/232 |

*Primary Examiner*—Karen M. Young
*Assistant Examiner*—Thuy V. Tran
*Attorney, Agent, or Firm*—Millen, White, Zelano & Branigan, P.C.

[57] ABSTRACT

The present invention is an improved wheeled, light-weight lift which meets standards for airline ground support vertical lift devices, specifically being capable of use on airport tarmacs in winds up to 90 mph. On and off-loading ramps are provided which are rotatable between an upright stored position and a horizontal working position. The ramps comprise a bridge structure supporting a plurality of louvred deck plates. Each louvre is linked to the others so as to remain oriented horizontal regardless of the ramps position for minimizing their aerodynamic profile and overturning moment. Outriggers are extendible from the frame so as to increase its base dimensions and thus the moment needed to overturn the lift. The outriggers retract into the frame to minimize storage. The outriggers are horizontally movable along their longitudinal axis to minimize the deployment space required. Lastly, it is preferable to increase the effective weight of the lift by providing wind deflection surfaces or airfoils to create a downward reactive force and thereby increase lift's resistance for overturning.

13 Claims, 9 Drawing Sheets

LIGHTWEIGHT VERTICAL LIFT DEVICE FOR WINDY CONDITIONS

CROSS-REFERENCE TO RELATED APPLICATION

This application obtains the benefit under 35 U.S.C. § 120 of provisional application Ser. No. 60/003,433 filed Sep. 8, 1995, entitled "Mobile Wheelchair Lift for Aircraft" by Dave W. Smith.

FIELD OF THE INVENTION

The invention relates to light weight lifts for elevating payloads and mobility impaired persons, and more specifically to lifts which are resistant to the effect of wind loading.

BACKGROUND OF THE INVENTION

Motorized ground support devices, or lifts, are used for lifting mobility-impaired passengers to an elevated aircraft hatchway. These lifts are known generally as "Vehicle-Mounted Vertical Lift Devices". Due to the special hazards (particularly wind loading) and strict safety standards associated with aircraft and airport tarmacs, both the U.S. and Canada have introduced safety requirements for such lifts.

The American National Standards Institute, Inc. (ANSI) imposes standard ANSI A92.7-1981, entitled—American National Standard Safety Requirements for Airline Ground Support Vehicle-Mounted Vertical Lift Devices which specify materials of construction, quality, load rating and more particularly, stability requirements. Specifically, the standards call for ground support lifts to withstand lateral wind loading (such as from a jet engine blast) of 90 mph without overturning. In Canada, the Canadian General Standards Board has adopted similar stability requirements pursuant to Society of Automotive Engineer's standard SAE ARP 1247, Para. 3.13.1.9.—substantially identical to the ANSI standard.

Powered lifts for aircraft access have been available for several years. The power sources include conventional electrical and internal combustion engines. While the maneuvering of the lifts may be either powered or manual, the means for elevating the deck itself are consistently powered.

The stability of powered lifts in wind conditions is achieved through a combination of high weight (typically greater than 1000 pounds), and a large ground-engaging frame size. As such powered lifts are generally transportable on resilient wheels, ground-engaging feet are sometimes lowered from the lift's frame to further stabilize the lifts during use.

Examples of motorized lifts which meet these standards include: the "Just Mobility Flight Access System", available from Brownie Tank Mfg. Co., Minneapolis, Minn.; and the "Wollard Passenger Access Lift" or "Hobard PAL", from Wollard Airport Equipment Co., Inc., Eau Claire, Wis.

Users associate certain disadvantages with such lifts including:
  high capital cost;
  high maintenance costs;
  low reliability particularly where the lift is used infrequently or in low temperatures;
  risk of damage to the aircraft while maneuverability and operating the deck; and
  difficulty maneuvering on uneven surfaces, ice and snow.

Accordingly, there is a need for a more reliable, more versatile, cheaper lift—more particularly, being light and hand-maneuverable.

Unfortunately, providing a light-weight manoeuvrable lift often times introduces conflicting and challenging design criteria, such as:
  maintaining a compact and light structure which is important for facilitating hand-powered manoeuvring of the lift to, from and around the close confines around an aircraft, which is in direct conflict with
    maintaining a substantial mass for better withstanding side wind loading, and
    providing as large base structure as possible for creating as large a moment arm so as to resist an overturning moment,
  providing a light weight, preferably hand-operated device for elevating the deck; and
  maintaining a small wind profile which directly conflicts with providing
    on and off-loading ramp or ramps which necessarily have a upstanding profile (to minimize the impact on the lift's storage and manoeuvrability) and large, continuous aerodynamic surfaces, (screened or meshed ramp surfaces being psychologically unacceptable for supporting passengers)
    surfaces associated with the lift's structural and safety functions, and
    the elevating device.

Several of the above criteria have been satisfied by a known apparatus described in U.S. Pat. No. 4,926,973, issued to the applicant. This reference describes a hand-operated device for lifting mobility impaired persons which is characterized by:
  a lightweight substantially aluminum frame supporting a vertically moveable deck;
  a lifting mechanism for raising and lowering the deck which incorporates a self locking winching system which utilizes hand-powered cranking to both lift and lower the deck; and
  ground-engaging wheels which only operate when the deck is in its lowermost position.

Unfortunately, this apparatus does not meet the above-stated standards for stability.

SUMMARY OF THE INVENTION

The preferred embodiment of the present invention relates to an improved light-weight, and hand-manoeuvrable lift which is suitable for confined areas and wind conditions. The lift remains light-weight for achieving ease of manual manoeuvring over adverse surfaces, remains a reduced threat to sensitive aircraft, and minimizes the dependence on powered systems which ensures high reliability.

The improved lift incorporates into its design light-weight solutions which: minimize the lift's aerodynamic profile for reducing the overturning moment; maximize its ground-engaging base to increase the lift's resistance to overturning (referred to hereinafter as the resisting moment); and maximize the lift's ground loading, which also increases its resisting moment.

More particularly, on and off-loading ramps are provided which utilize a plurality of louvred deck plates which form a psychologically secure and substantially continuous deck surface. The ramp is pivotable between two positions; upwards to an upstanding stored position and downwards to a horizontal working position. While pivoting between stored and working positions, each of the deck plates are linked to rotate together, preferably using a parallelogram linkage, so that they remain oriented horizontally at all ramp positions, thereby minimizing their aerodynamic profile and overturning moment.

Secondly, the width and depth of the base of the lift is effectively increased (nearly doubled) using extendible outriggers so as to increase the moment needed to overturn the lift. Due to the space restrictions and the sensitivity of the aircraft to potential damage, outriggers are provided which minimize the space required for their deployment. More specifically, a plurality of outriggers can be deployed horizontally along their longitudinal axis and outwards from the lift, minimizing opportunity for contact with nearby structures, including aircraft. When the outriggers bear the lift's weight, they automatically and frictionally lock in place.

Lastly, in its most preferred form, the effective weight of the lift is manipulated by providing aerodynamic surfaces on the structure. Wind deflection surfaces or airfoils use the force of the wind to cause a downward reactive force, increasing the resistive moment. The resultant resisting moment is increased more so than is the increase in overturning moment resulting from increased side drag of the wind on the surfaces.

Therefore, broadly stated the present invention is a hand-manoeuvrable vehicle-mounted vertical lift apparatus capable of moving a payload-supporting deck between ground and elevated positions, for use in wind loading conditions without overturning, in combination comprising: a lightweight frame, within which the deck is movably supported; wheels movable between two positions, namely a ground-engaging position for elevating the frame sufficiently for enabling transport and a retracted position for lowering the frame to bear fully on the ground; a deck access and egress ramp having a pair of parallel bridge members whose first ends are pivotally mounted to the deck and whose second ends are rotatable about the first end between an upright stored position and a substantially horizontal working position, said ramp having a plurality of louvres pivotally mounted and extending transversely between the bridge members; means for simultaneously rotating the ramp's louvres as the ramp is rotated between stored and working positions, so that each louvre remains oriented horizontal and parallel to each other, wherein, in the working position, the louvres lay horizontally to form a substantially continuous surface so that payload may be moved on and off of the deck and, in the upright stored position, the louvres continue to lay horizontally so that the aerodynamic profile of the ramp is minimized so that the overturning moment imposed on the lift by side wind loading is not significantly increased, and does not exceed the lift's resisting moment, regardless of the ramp's position.

DESCRIPTION OF THE PREFERRED EMBODIMENT

Figure 1A:
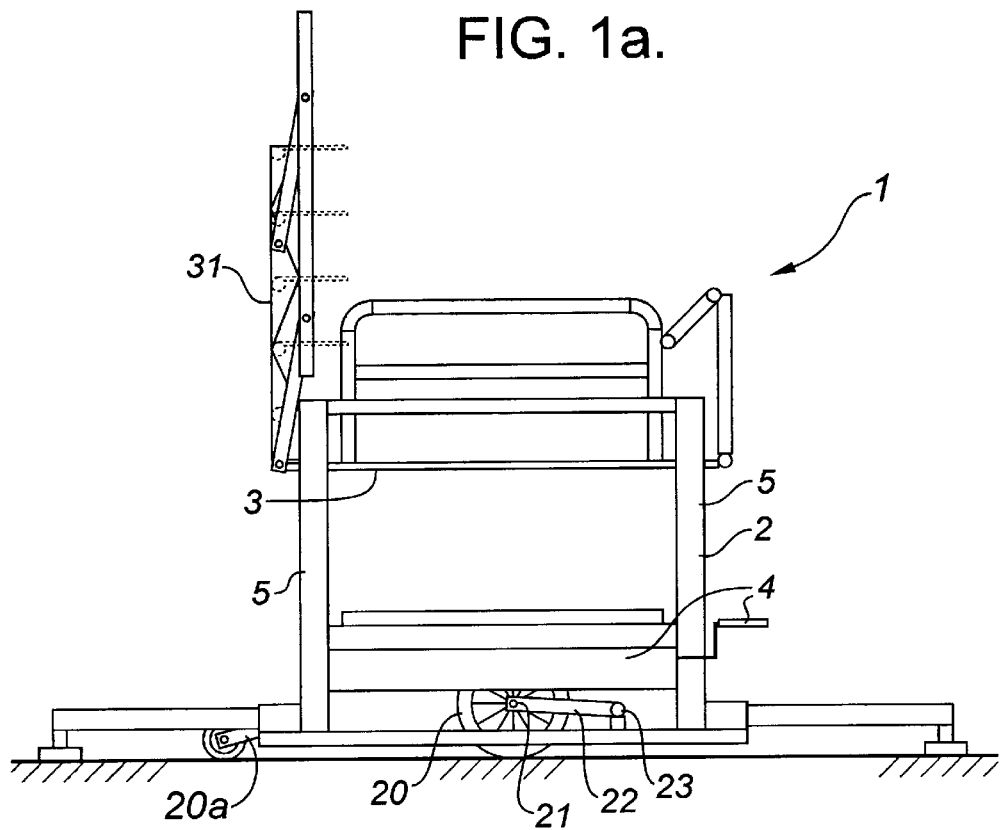
FIG. 1a is a side view of the preferred embodiment of the invention showing the deck elevated and the bridge ramp in the upright stored position.
Figure 1B:
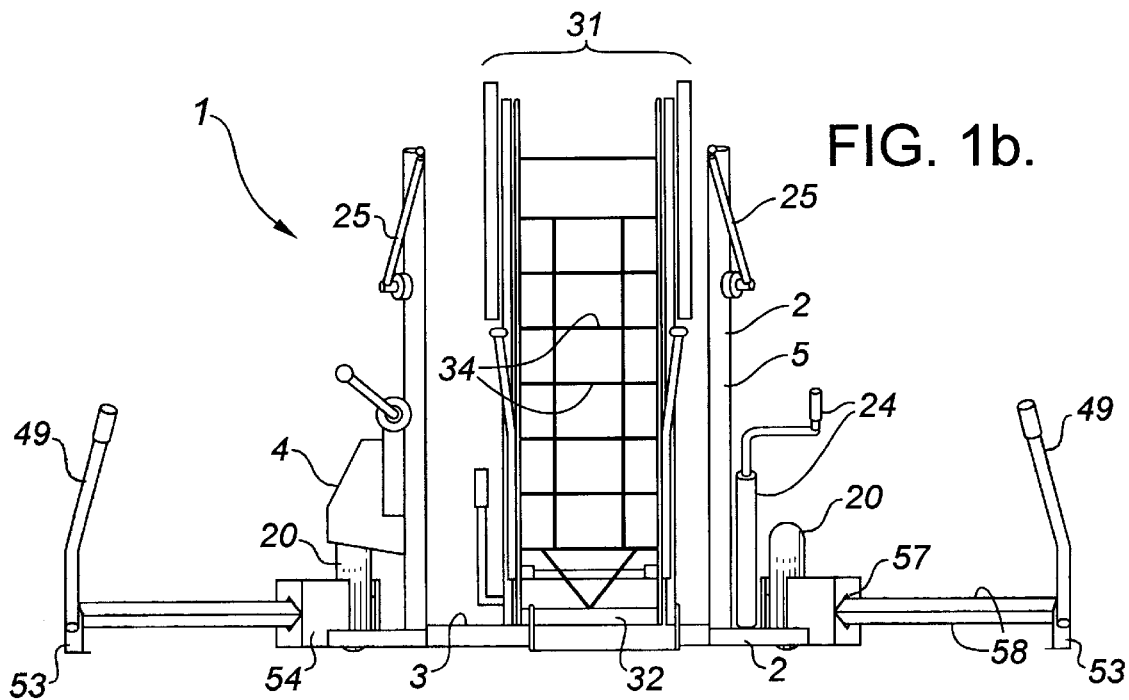
FIG. 1b is an end view of the lift according to FIG. 1a, showing the deck lowered and the bridge ramp in the upright stored position.

Having reference to FIGS. 1a and 1b, a ground support lift 1 is provided comprising a frame 2, a deck 3, a deck-elevating winch 4 and wheels 20 which can be lowered from the frame 2 to engage the ground and enable rolling transport of the frame. The deck 3 is vertically movable in the frame 2 for elevating mobility impaired passengers, such as wheelchair-bound persons for enabling access to aircraft and the like. The frame 2, deck 3, and hand-powered winch 4 are substantially the same as those disclosed in issued U.S. Pat. No. 4,926,973 to applicant, the content of which is incorporated herein by reference. Briefly, for convenience, the prior art wheelchair lift is summarized as follows.

The 5 foot by 5 foot square frame 2 comprises an substantially aluminum structure having vertical standards 5 extending upwards from four corners of the frame 2. The standards act to support four corners of the deck 3.

Figure 3:
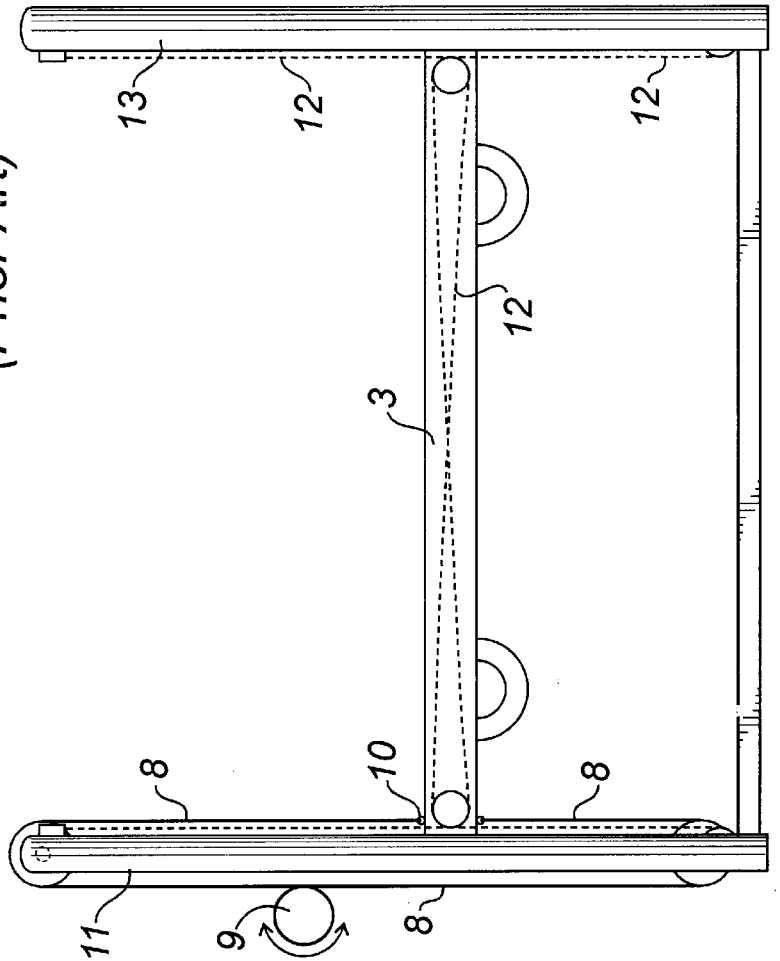
FIG. 3 is an end view of the prior art winch, frame and deck of FIG. 2, in particular, illustrating the parallel cabling system.
Figure 2:
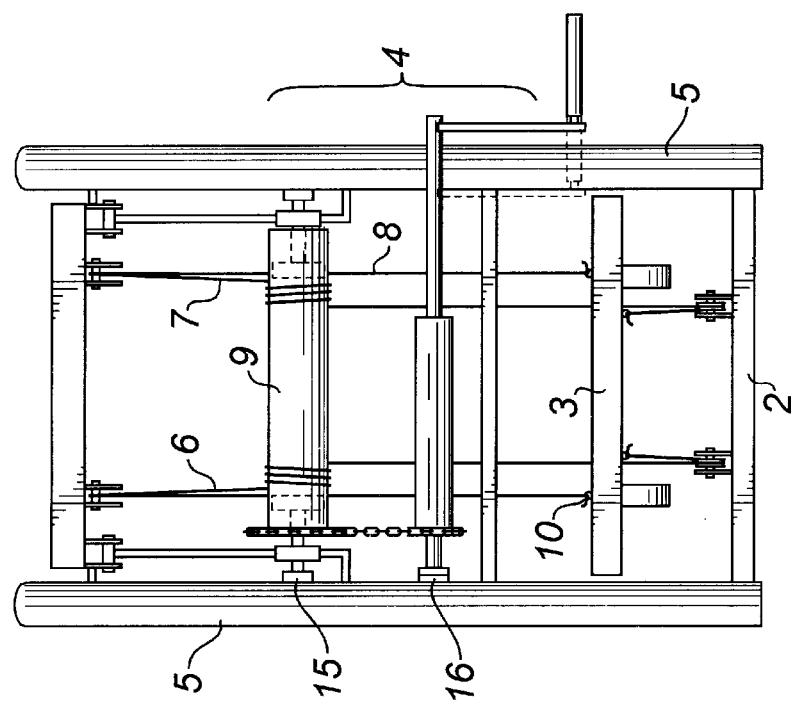
FIG. 2 is a side view of a prior art hand-powered winch, frame and deck.

Having reference to FIGS. 2 and 3, the prior art deck-elevating winch comprises two parallel cable systems 6,7, each acting to lift one side of the deck 3. Together, the two cable systems 6,7 cooperate to lift both sides of the deck 3 horizontally and in unison. Each cable system 6 and 7 comprises a first cable 8 wound onto and dispensed from a drum 9 for lifting and lowering a first corner 10 of one side of the deck 3 from one standard 11 and a second cable 12 arranged in parallel cable fashion from a second standard 13 so as to guide a second corner 14 of the deck 3.

A combination of parallel shafts 15,16 incorporate sufficient mechanical advantage so that the winch can be powered by a hand crank 17. A one way clutch (not shown) enables free rotation of the winch while lifting the deck 3. When lowering the clutch engages a drum braking system (not shown) associated with the drum 9 for safely controlling the descent.

Referring again to FIGS. 1a and 1b, the above known apparatus is fitted with a pair of wheels 20 for support during ground transport of the frame 2. The wheels 20 are positioned beneath the frame 2 and spaced apart along a line passing substantially through the centroid of the lift 1 for ease of manoeuvrability. Each wheel 20 is mounted at the end distal end 21 of arm 22. Arms 22 are pivoted from the base of the frame 2 at their proximal end 23. The arms 22 are linked so as to pivot in unison between transport and resting positions. In the resting position, the arms 22 retract or pivot upwards, lifting the wheels 20, lowering the frame 2 to rest on the ground. In the transport position, arms 22 pivot downwards, lowering the wheels 20 into engagement with the ground, and lifting the frame 2 until it may be moved on the wheels 20. A screw jack 24 is employed to position the arms 22. Guide wheels on casters 20a are employed to prevent excessive rocking of the lift. The casters 20a are spaced slightly from the ground in the transport position to avoid limiting manoeuvrability. The casters 20a move vertically in unison with the wheels 20.

Brakes (not shown) engage the wheels. Brake-actuating handles 25 are movable between an upright braking position (shown) and lowered brake-released position. The handles 25 further assist in steering the frame 2 during wheeled transport.

In a first embodiment of the present invention, one or two ramps 30 provide access onto and off of the deck 3. By providing two ramps 30,31, located on opposing sides of the frame 2, one avoids the need to move the lift 1 in between deck-loading and unloading operations. A ground ramp 30 enables access between the deck and the ground and a bridge ramp enables access between the deck and the elevated structure of interest (ie. an aircraft).

The ramps 30,31 enable mobility aids such as wheeled dollies and wheelchairs (not shown) to roll safely on and off of the deck 3, while also providing a continuous surface for foot traffic.

Figure 4A:
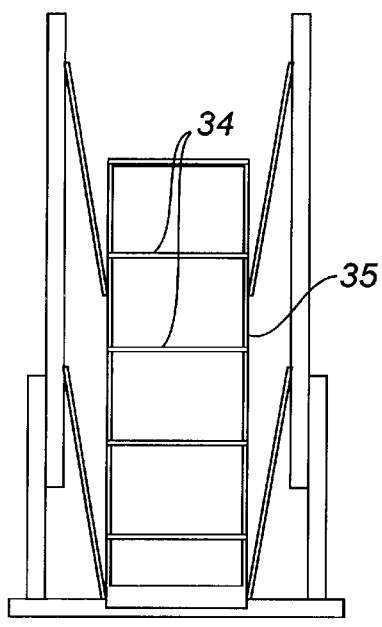
FIG. 4a is a partial end view of the lift according to FIG. 1, showing only the deck and one ramp in the upright stored position.
Figure 4B:
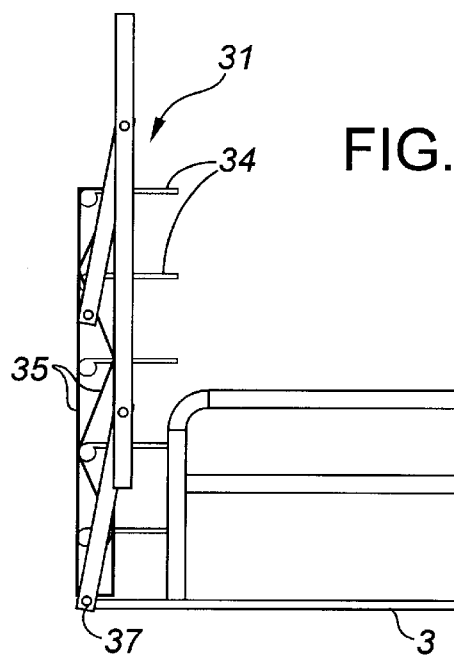
FIG. 4b is a partial side view of the lift according to FIG. 1, showing only the deck and two ramps in the upright stored position.
Figure 5:
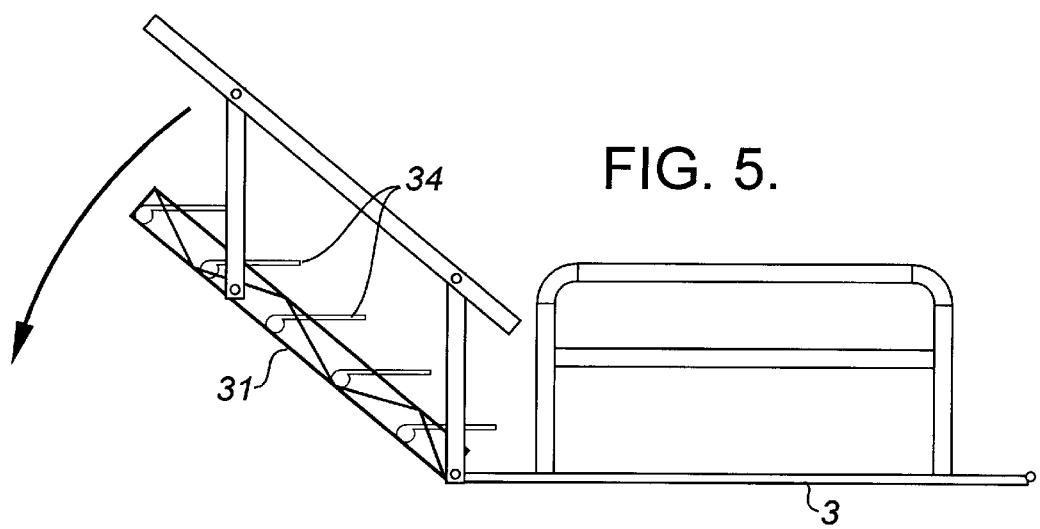
FIG. 5 is a side view of the deck of FIGS. 4a and 4b showing the ramp while being rotated from the stored to the working position.
Figure 6:
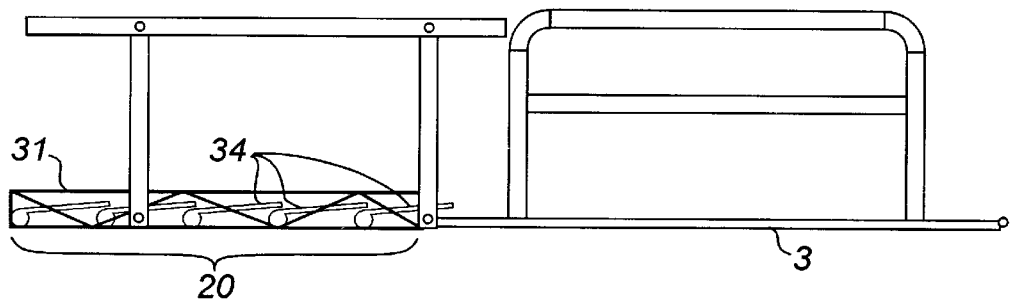
FIG. 6 is a side view of the deck of FIGS. 4a and 4b showing the ramp in the horizontal working position.
Figure 7A:
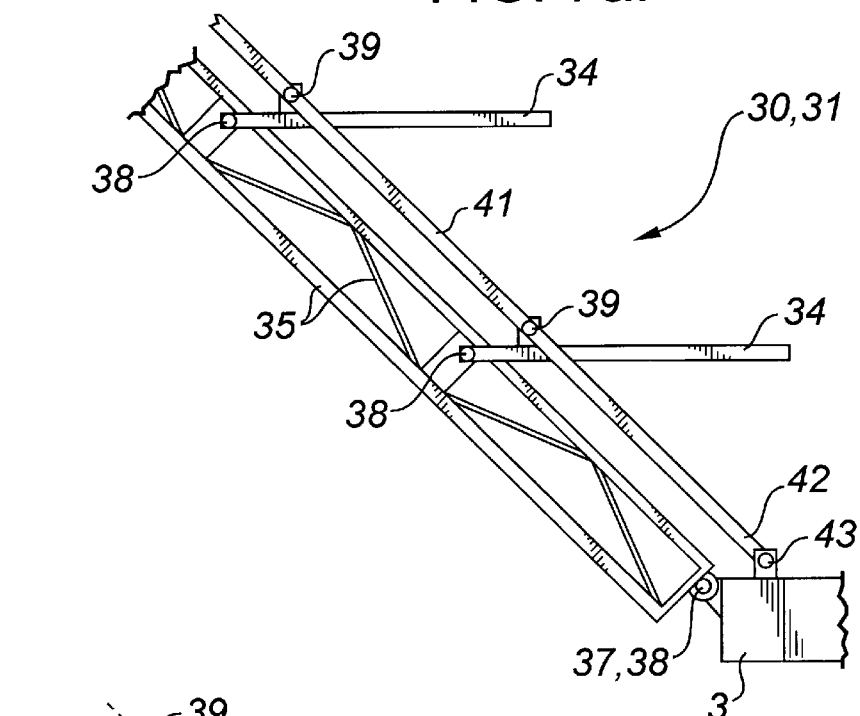
FIG. 7a is a partial side view of the deck, ramp, linkage and first two louvres while the ramp is being rotated.
Figure 7C:
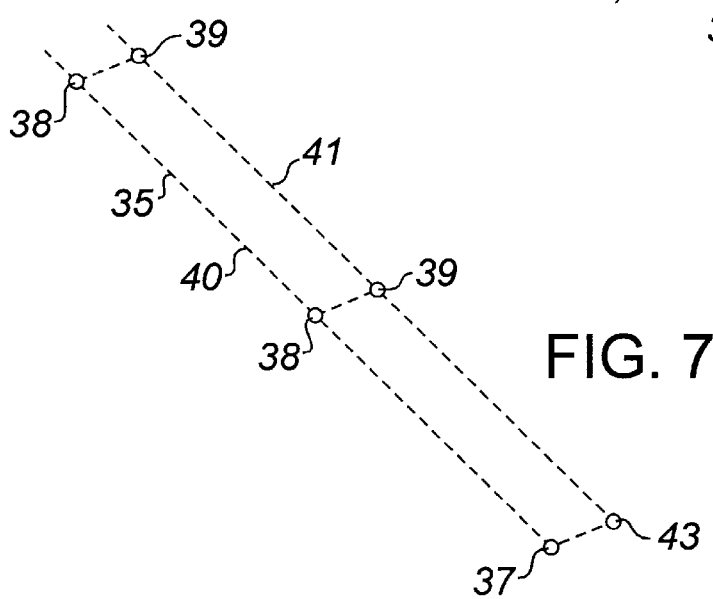
FIG. 7b is a partial side view ramp of FIG. 7a, once the ramp is in the working condition and the louvres form a substantially continuous surface.
Figure 7B:
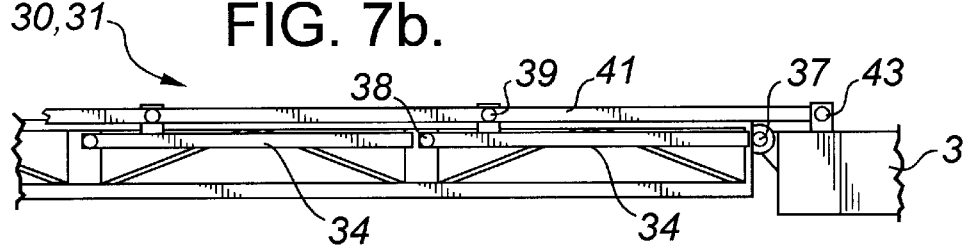

Each ramp 30,31 has a first end 36 which is mounted to the deck 3 with a pivot 37. The second end 34 is rotatable about the pivot 33 between two positions: an upright stored position (FIGS. 1a, 4a, 4b) and a horizontal working position (FIG. 6). The upright position does not encroach either on the deck area reserved for the passenger or the area immediately around the lift. It is desirable that the lift be as compact as possible, either in storage or in transit.

The ramp's 30,31 working position is substantially horizontal; bridging the deck 3 with either the ground or an aircraft.

When stored upright, the ramps 30,31 can represent a large aerodynamic profile if its surface by continuous. Note that a continuous surface is required for providing a functional ramp, but it unfortunately also seriously increases the exposure to side wind loading and overturning moment. Thus, in the present invention, the ramp's surface is formed of a plurality of louvres 34.

The louvres, when laid end-to-end, form the requisite, substantially continuous surface. However, in the upright stored position, the ramp's louvres 34 are rotated in unison so as to maintain a horizontal profile throughout rotation of the ramp 30,31, thereby minimizing wind loading.

More specifically, and having reference to FIGS. 4a,4b—6, each ramp 30,31 comprises parallel and laterally-spaced load-supporting bridge beams or trusses 35. The trusses 35 are mounted at their first end 36 by pivot 37 to the deck 3 for rotation between the stored and working positions. Each louvre 34 is a rectangular plate. The louvres 34 extend transversely between the trusses 35. First pivots 38 rotationally mount each louvre 34 to the truss 35 and extend between the edge of the louvre 34 abutting each truss 35. The first pivots 38 are spaced equidistant along the truss 35. The plane of the louvres 34 extend outwardly from the first pivots 38. A second pair of pivots 39 are mounted to the louvres 34, spaced outwardly from the first pair of pivots 38. Movement of the second pivots 39, relative to the first pivots 38, causes the louvres to rotate.

A four bar linkage 40 (described below) enables all the louvres 34 to be rotated in unison. The linkage 40 ensures that during rotation of the ramp 30,31 (FIG. 5), each louvre 34 maintains a horizontal orientation throughout the rotation. When the ramp 30,31 is stored upright (FIGS. 4a,4b), all of the louvres 34 rotate to become oriented horizontally for presenting the minimum profile to side wind loading. Ultimately, in the working position (FIG. 6), each louvre 34 lays adjacent the next louvre 34 and forms a substantially continuous surface.

The four-bar linkage 40 comprises a plurality of successive parallelograms formed between each louvre 34 and between the deck 3 and the next adjacent louvre 34. More particularly, the linkage comprises the pair of trusses 35, along which are spaced the first pivots 38. A pair of linkage members 41 lay parallel and adjacent to the pair of ramp trusses 35, along which are spaced the second pivots 39. Like the trusses, the linkage members 41 are pivoted at one end 42 by pivot 43 from the deck 3. The truss 35 and linkage members 41 form two parallel sides of a parallelogram. Every two adjacent louvres 34 form the other two parallel sides of each parallelogram, and are spaced along the trusses and linkage member. Thus, the corner of each parallelogram is a pivot 37, 43, 37, 43.

The spacing between the truss's and linkage member's deck pivots 37,43 is the same as the spacing between the first and second pivots 38, 39 on the louvres 34.

As each ramp 30,31 rotates, the four bar parallelogram linkage 40 causes the louvres 34 to rotate, while remaining parallel to each other. The louvres 34 are designed to maintain a horizontal orientation throughout the rotation. The second pivots 39 are offset slightly from the plane of the louvres 34, thereby permitting the louvres to attain a substantially continuous surface, even though the linkage member 41 and truss 35 do not intermesh.

Both the ground access ramp 30 and the bridge ramp 31 are similarly fitted with the pivoting, louvred surfaces.

Turning now to FIGS. 1 and 8–11, the frame 2 is fitted with outriggers 50 for increasing the moment arm of the lift to resisting overturning (increased resisting moment) Four outriggers are shown. The outriggers 50 comprise slender cantilevered beams 51 which are supported by guides 52 located near the corners of the base of the frame 2.

Figure 8:
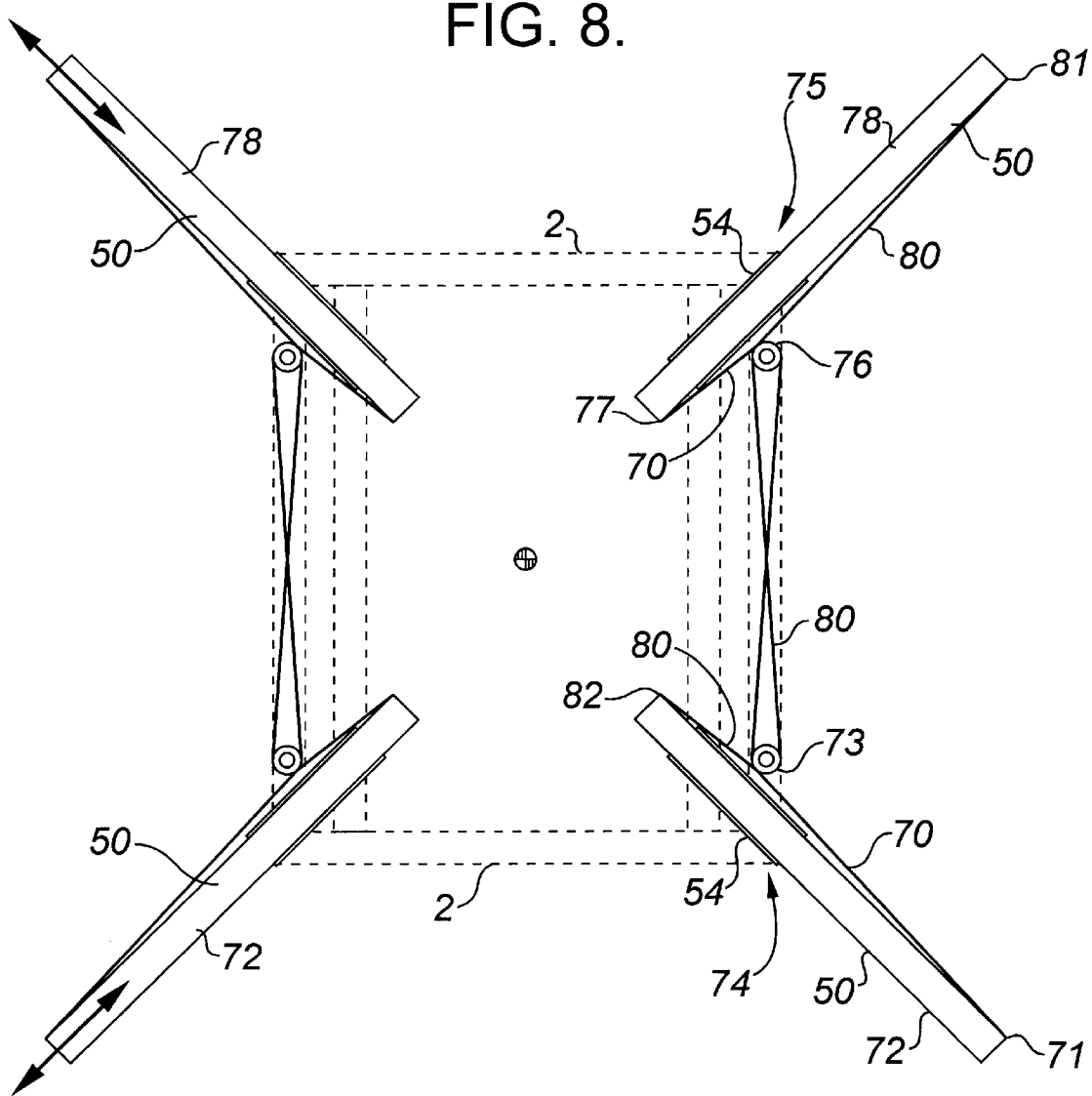
FIG. 8 is an aerial view of the outriggers with the frame and deck removed for clarity.

To minimize the deployment space required and thereby minimize opportunities to strike sensitive aircraft components, the outriggers 50 are designed to be moveable along their longitudinal axis (FIG. 8). Thus, the deployment area affected is limited to the cross-section of the beam 51. When the frame 2 is raised from the ground (by screw jack 24), the outriggers 50 are laterally extendible and retractable from the guides 52.

Ground engaging pads 53 (FIG. 1) depend from the outboard ends of each outrigger 50. When the frame is lowered, the pads 53 contact the ground to support the outrigger 50 and the frame 2. When retracted, the outriggers pads 53 form a base of about 6 feet by 6 feet. When extended, the outriggers pads 53 increase the frame's base to about 10×10 feet square.

Once extended, the frame 2 is lowered using the screw jack 24. The pads 53 engage the ground to fully support the lift 1 and provide about a 60% increase in the resistive moment of the lift 1.

When the frame 2 is elevated, the outriggers 50 are freely moveable through the guides 52, and conversely, when the frame 2 rests on the outrigger's pads 53, the outriggers 50 are functionally locked in their extended position through frictional contact with the guides.

Figure 9:
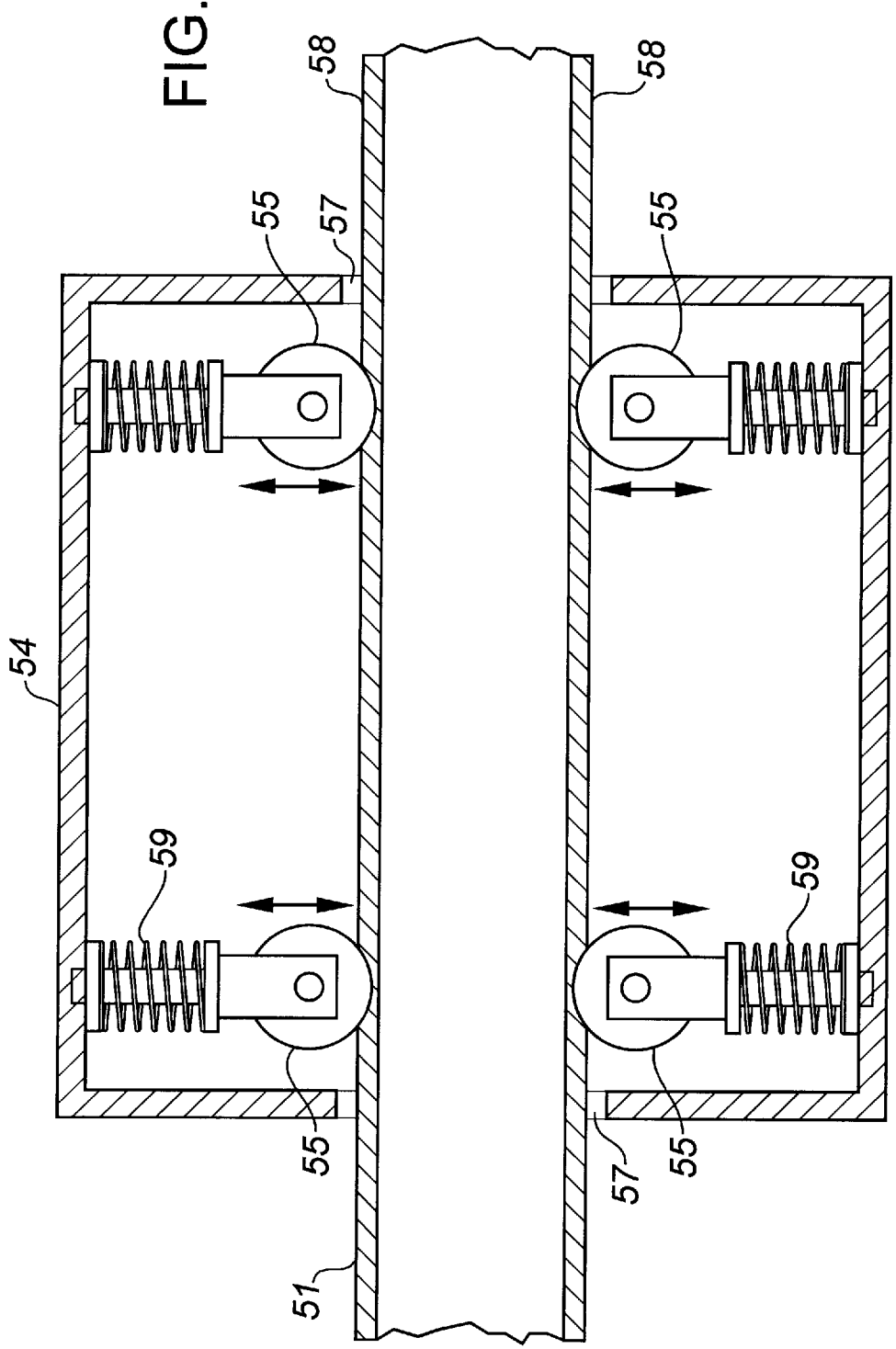
FIG. 9 is a cross-sectional side view of the outrigger and outrigger guide, in particular, while the frame is elevated and the outrigger is free moving.
Figure 10:
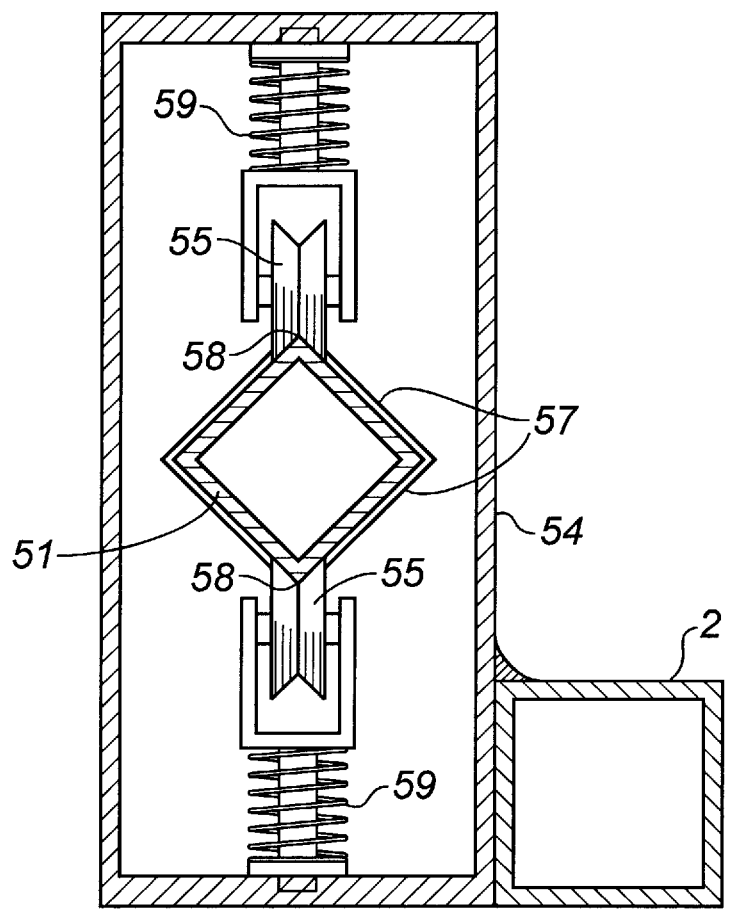
FIG. 10 is a cross-sectional end view of the outrigger and outrigger guide, according to FIG. 9.
Figure 11:
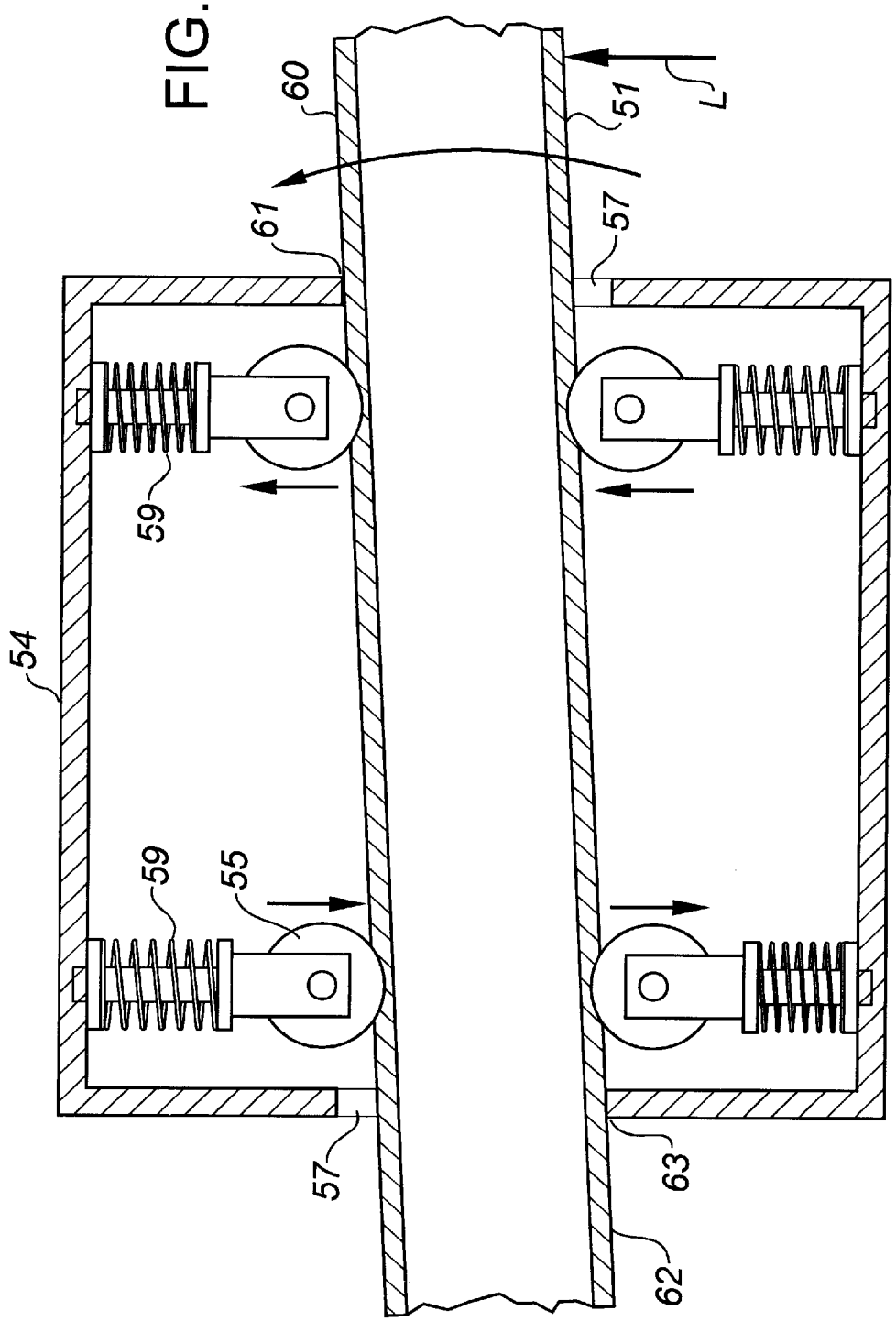
FIG. 11 is cross-sectional side view of the outrigger and outrigger guide, in particular, while the frame is lowered, the outrigger is bearing the frames weight, and the outrigger is frictionally locked against the guides outboard and inboard walls.
Figure 12:
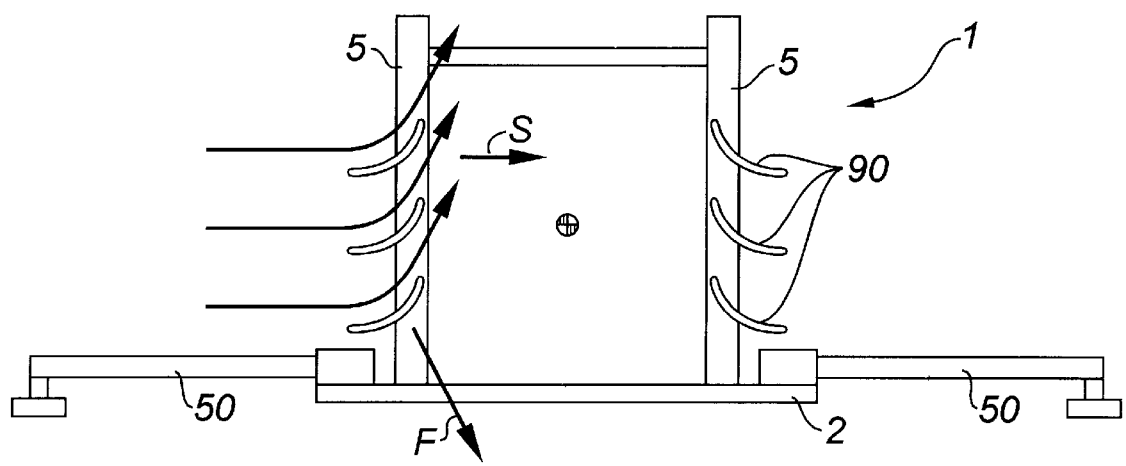
FIG. 12 is a partial, side cross-sectional view of the lift, showing the aerodynamic surfaces, the path of the wind and the reactive force. The lift and ramps are removed for clarity.

More particularly, having reference to FIGS. 9 and 10, the guide 53 comprises a housing 54. Four rollers 55 are contained within the housing 54. Two rollers 55 lie above and two below the beam 51 in a rectangular arrangement. Each roller 55 has a grooved circumference 56 having a "V"-shaped section.

The outrigger's square beam 51 extends through ports 57 formed in the inboard and outboard walls of the guide. The beam 51 has a square cross-section having its diagonal corners 58 oriented vertically. The guide's ports 57 are correspondingly square and slightly oversized for freely passing the outriggers beam 51 if centralized in the ports 57. The roller's groove 56 engages the beam's opposing upper and lower corners 58. The rollers 55 support and centralize the beam 51 in the port 57. Springs 59 bias the rollers 55 inwardly and are sufficiently strong to support the weight of the beam 51 and its cantilever moment as it is extends fully outwards, thereby preventing the beam from dragging in the port 57.

When the frame 2 is lowered and the pads 53 engage the ground, the outward ends of the beams 51 are deflected upwards. The weight of the lift 1 overcomes the force imposed by the springs 59, permitting the beams 51 to rotate. The beams engage the edge of the guide's port 57 for frictionally resisting subsequent lateral movement; the resistance being proportional to the load L on the beams 51. More specifically, when loaded, the upper surface 60 of the beam 51 contacts the outboard, port's upper edge 61 and the beam's lower surface 62 contacts the inboard port's lower edge 63.

As shown in FIG. 8, the four outriggers 50 are arranged in pairs. Each pair is conveniently interconnected with a parallel cable system. Movement of one outrigger activates the cable system to similarly direct the movement of an adjacent outrigger. More specifically, a first cable 70 runs from the outboard end 71 of first outrigger 72 and around pulley 73 located adjacent the guide housing 54 at a first corner 74 of the frame 2. The first cable 70 then traverses the frame 2 to next adjacent corner 75 and around another pulley 76 to the inboard end 77 of second outrigger 78. Outward extension of the first outrigger 72 pulls the first cable 70 which in turn pulls the inboard end 77 of the second outrigger towards pulley 76, pulling or extending second outrigger outwards. A second cable 80 is similarly run between the pulleys 76,73 and to the inboard end 82 of the first outrigger 72. Retraction of the first outrigger 72 pulls the second cable 80 which in turn pulls the outboard end 81 of the second outrigger 78 towards pulley 76, retracting the second outrigger 78.

In a second embodiment, aerodynamic surfaces 90 are provided on the frame 2 for increasing the effective weight of the lift 1 under lateral wind conditions, and thereby increasing the resisting moment. The surfaces can include inertial deflection of wind W or the use of airfoil shapes and the Bernouli effect to create a downward force vector F. The profile and orientation of the surfaces 90 is such that side wind W forms a downward reactive force F. Wind W acting on any surface, including the surfaces, creates a side force S which also increases the overturning moment. The surfaces 90 are designed such that the downward reactive force (which increases the resisting moment) is increased more so than is the increase in overturning moment.

The deflectors 90 are mounted low on the frame 2 to lessen the moment arm and further minimize the increase in overturning moment from side drag.

Other embodiments can be provided by substituting other members of the generically described members of this invention for those used in the preceding embodiments.

The entire disclosure of all applications, patents and publications, cited above and below, and of corresponding U.S. Provisional Application 60/003,433, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

The embodiments of the invention in which an exclusive property or privilege is claimed are defined as follows:

1. A hand-manoeuvrable vehicle-mounted vertical lift apparatus capable of moving a payload-supporting deck between ground and elevated positions, for use in wind loading conditions without overturning, in combination comprising:

a lightweight frame, within which the deck is movably supported;

wheels movable between two positions, a ground-engaging position for elevating the frame sufficiently for enabling transport, and a retracted position for lowering the frame to bear fully on the ground;

outriggers outwardly extendible from the frame for extending the base area whereby moment arm for resisting an overturning moment is increased, the outriggers comprising three or more beams having inboard and outboard ends, the outboard ends of the beams being laterally movable between a stored position and a stabilizing position, said stored position having the outboard ends of the beams contained substantially within the footprint of the frame, said stabilizing position having the outboard end of the beams extended to a position outboard of the frame, said beams being extendable along their longitudinal axis, the ends of the beams having ground engaging pads so that when the ground engaging wheels are retracted, the weight of the frame is transferred to the beams and through the pads to the ground, and a housing having inboard and outboard ports though which the beam extends and biasing means for guiding the beams within the housing so that when the beams are not supporting the frame, the beams are centered in the ports and freely moveable therethrough, and when the beams are supporting the frame, the beams rotate so as to contact the edges of the ports and frictionally engage the beams, thereby preventing further longitudinal movement once the frame weight is transferred thereto;

a deck access and egress ramp having a pair of parallel bridge members whose first ends are pivotally mounted to the deck and whose second ends are rotatable about the first end between an upright stored position and a substantially horizontal working position, said ramp having a plurality of louvres pivotally mounted and extending transversely between the bridge members;

means for simultaneously rotating the ramp's louvres as the ramp is rotated between stored and working positions, so that each louvre remains oriented horizontal and parallel to each other, wherein, in the working position, the louvres lie horizontally to form a substantially continuous surface so that payload may be moved on and off of the deck and, in the upright stored position, the louvres continue to lie horizontally so that the aerodynamic profile of the ramp is minimized and the overturning moment imposed on the lift by wind loading is not significantly increased, and does not exceed the lift's resisting moment, regardless of the ramp's position.

2. The vertical lift apparatus recited in claim 1 wherein the lift comprises two ramps, each having rotatable louvres.

3. The vertical lift apparatus recited in claim 1 wherein the means for rotating the louvres is a four-bar parallelogram linkage system comprising:

at least one link member laying parallel and adjacent a bridge member, the link member being pivotally mounted to the deck adjacent the bridge member's deck pivot, the bridge and link member forming a first pair of parallelogram sides; and each louvre having first pivots mounted to the bridge members and second pivots mounted to the link member so that each pair of adjacent and parallel louvres form a second pair of parallelogram sides, wherein the bridge member, link member and louvres form a four-bar linkage so that upon rotation of the ramp between upright and working positions, the relative movement between the bridge and link members rotates the louvres, each louvre remaining parallel to each other louvre and oriented substantially horizontal.

4. A hand-manoeuvrable vehicle-mounted vertical lift apparatus capable of moving a payload-supporting deck between ground and elevated positions, for use in wind loading conditions without overturning, in combination comprising:

a lightweight frame, within which the deck is movably supported;

wheels movable between two positions, a ground-engaging position for elevating the frame sufficiently for enabling transport, and a retracted position for lowering the frame to bear fully on the ground;

outriggers outwardly extendible from the frame for extending the base area whereby moment arm for resisting an overturning moment is increased;

aerodynamic surfaces attached to the lift which create a downward force in reaction to wind loading, said reactive force being greater than the force resulting from drag, whereby the lift's resistance to overturning is increased.

a deck access and egress ramp having a pair of parallel bridge members whose first ends are pivotally mounted to the deck and whose second ends are rotatable about the first end between an upright stored position and a substantially horizontal working position, said ramp having a plurality of louvres pivotally mounted and extending transversely between the bridge members;

means for simultaneously rotating the ramp's louvres as the ramp is rotated between stored and working positions, so that each louvre remains oriented horizontal and parallel to each other, wherein, in the working position, the louvres lie horizontally to form a substantially continuous surface so that payload may be moved on and off of the deck and, in the upright stored position, the louvres continue to lie horizontally so that the aerodynamic profile of the ramp is minimized and the overturning moment imposed on the lift by wind loading is not significantly increased, and does not exceed the lift's resisting moment, regardless of the ramp's position.

5. The vertical lift apparatus recited in claim 4 wherein the outriggers comprise:

three or more beams having inboard and outboard ends, the outboard ends of the beams being laterally movable between a stored position and a stabilizing position;

said stored position having the outboard ends of the beams contained substantially within the footprint of the frame;

said stabilizing position having the outboard end of the beams extended to a position outboard of the frame;

said beams being extendable along their longitudinal axis, the ends of the beams having ground engaging pads so that when the ground engaging wheels are retracted, the weight of the frame is transferred to the beams and through the pads to the ground.

6. The vertical lift apparatus recited in claim 5 wherein the moment extending beams further comprise:

means for locking the longitudinal movement once the frame weight is transfer thereto.

7. The vertical lift apparatus recited in claim 6 wherein the locking means comprises:

a housing having inboard and outboard ports though which the beam extends;

biasing means for guiding the beams within the housing so that when the beams are not supporting the frame, the beams are centered in the ports and freely moveable therethrough, and when the beams are supporting the frame, the beams rotate so as to contact the edges of the ports and frictionally engage the beams, thereby preventing further longitudinal movement.

8. A hand-manoeuvrable vehicle mounted payload-supporting deck for use in wind loading conditions without overturning, in combination comprising:

a wheeled lightweight frame, within which the deck is movably supported;

aerodynamic surfaces attached to the vehicle which create a downward force in reaction to wind loading, said reactive force being greater than the force resulting from drag, whereby the vehicle's resistance to overturning is increased.

9. A hand-manoeuvrabie vehicle-mounted payload-supporting deck for use in wind loading conditions without overturning, in combination comprising:

a lightweight frame, within which the deck is supported;

wheels movable between two positions, a ground-engaging position for elevating the frame sufficiently for enabling transport, and a retracted position for lowering the frame to bear fully on the ground;

outriggers outwardly extendible from the frame for extending the base area whereby moment arm for resisting an overturning moment is increased, the outriggers comprising three or more beams having inboard and outboard ends, the outboard ends of the beams being laterally movable between a stored position and a stabilizing position, said stored position having the outboard ends of the beams contained substantially within the footprint of the frame, said stabilizing position having the outboard end of the beams extended to a position outboard of the frame, said beams being extendable along their longitudinal axis, the ends of the beams having ground engaging pads so that when the ground engaging wheels are retracted, the weight of the frame is transferred to the beams and through the pads to the ground, and a housing having inboard and outboard ports though which the beam extends and biasing means for guiding the beams within the housing so that when the beams are not supporting the frame, the beams are centered in the ports and freely moveable therethrough, and when the beams are supporting the frame, the beams rotate so as to contact the edges of the ports and frictionally engage the beams, thereby preventing further longitudinal movement once the frame weight is transferred thereto.

10. The hand-manoeuvrable vehicle-mounted payload-supporting deck recited in claim 9 wherein the deck is moveable between ground and elevated positions within the frame.

11. The hand-manoeuvrable vehicle-mounted payload-supporting deck recited in claim 9 further comprising a deck access and egress ramp, the ramp having first and second ends, the first end being pivotally mounted to the deck and whose second end is rotatable about the first end between an upright stored position and a substantially horizontal working position.

12. The hand-manoeuvrable vehicle-mounted payload-supporting deck recited in claim 10 further comprising a deck access and egress ramp, the ramp having first and second ends, the first end being pivotally mounted to the deck and whose second end is rotatable about the first end between an upright stored position and a substantially horizontal working position.

13. The hand-manoeuvrable vehicle-mounted payload-supporting deck recited in claim 12 wherein the ramp further comprises a pair of parallel bridge members whose first ends are pivotally mounted to the deck and whose second ends are rotatable about the first end between an upright stored position and a substantially horizontal working position, said ramp having a plurality of louvres pivotally mounted and extending transversely between the bridge members;

means for simultaneously rotating the ramp's louvres as the ramp is rotated between stored and working positions, so that each louvre remains oriented horizontal and parallel to each other, wherein, in the working position, the louvres lie horizontally to form a substantially continuous surface so that payload may be moved on and off of the deck and, in the upright stored position, the louvres continue to lie horizontally so that the aerodynamic profile of the ramp is minimized and the overturning moment imposed on the lift by wind loading is not significantly increased, and does not exceed the lift's resisting moment, regardless of the ramp's position.

* * * * *